THREE DIMENSIONAL TELEVISION METHOD AND MEANS

Filed Sept. 25, 1959

INVENTOR.
FELIX LAURICELLA
BY
Townsend & Townsend
ATTORNEYS

United States Patent Office
3,165,578
Patented Jan. 12, 1965

3,165,578

THREE DIMENSIONAL TELEVISION METHOD AND MEANS

Felix Lauricella, 68 Post St., San Francisco, Calif.
Filed Sept. 25, 1959, Ser. No. 842,181
1 Claim. (Cl. 178—5.4)

Figure 1:
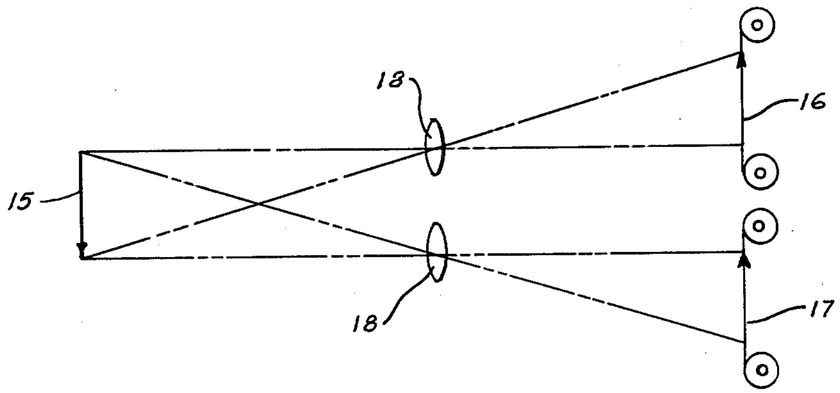

This invention relates to a method of and apparatus for transmitting three dimensional television broadcasts.

For many years the illusion of three dimensional images has been created by the technique of photographing identical subject matter from two perspective points bearing a relationship to each other substantially identical to the relationship of the two eyes of an observer. The photographic images are then viewed in side by side relationship so that they appear to be superposed one on the other thus giving the appearance of a three dimensional view.

In recent years the system has been varied by printing one of the images in one color and the other of the images superposed over the first image in another color wherein-after the observer when wearing eye glasses, each lens of which is designed to carry a filter of appropriate color characteristics, will allow each eye to see separate images. This process then gives the appearance of a black and white three dimensional image. The system has been used for motion pictures and still pictures.

In more recent years the system has been expanded for motion picture projection by the use of polarized filters in which the images are projected simultaneously on the screen from two separate projecting devices. The two devices are arranged to project the images through oppositely polarized filters and the images are superposed over each other on the viewing screen so that an observer wearing appropriately polarized glasses, i.e., each eye being polarized in the opposite direction, will see the three dimensional viewed picture.

A principal object of this invention is to provide an adaption of the general concept of three dimensional viewing or photography to television transmission by the novel method of transmitting simultaneously colored television broadcasts each keyed to opposite colors such as red and green, blue and orange and yellow and violet which are received simultaneously on color television sets so as to reproduce two superposed images of opposite colors. The viewer then by wearing spectacles having lenses or filters which are formed with each eye piece being of an opposite color keyed to the color of the reproduced television image will see a three dimensional broadcast.

Another object of this invention is to provide a simple device for allowing the broadcast of three dimensional television by the use of a conventional color television transmitter and receiver in which two images are broadcast in opposite colors so that they may be separately viewed by each eye by the use of appropriate filters over the eye in the receiving end.

A feature and advantage of this invention is that the source material for the television broadcast may either include live subject matter or black and white or color photographic images as well as the other conventional source material such as video tape and the like.

Another feature and advantage of this invention is that a stereoscopic black and white photograph or motion picture film when televised on a color television camera through oppositely keyed filters provides reproduced images on the television screen which are substantially absent from spurious colors because the televised images are substantially pure in their color characteristics.

Other objects of the present invention will become apparent upon reading the following specification.

In practicing the invention two colored television cameras are arranged in side by side relationship in a manner commensurate with the proper spacing and alignment required for the photographing of three dimensional photography. Each of the cameras is fitted with a filter of opposite color range to the filter of the other camera.

The signal from each of the cameras is fed to a central monitoring or mixing system wherein the signals can be superposed one on the other and registered by electronic adjustment of the two signals by having both cameras controlled by the same sync generator to center them relative to each other. This will obtain an integrated pair of superposed images of opposite colors which may be observed on the viewing screen of the monitor. The mixing systems normally used by conventional television stations which are used to mix the signals from two television cameras can adequately be used for this purpose.

The monitor or mixer provides an output which feeds the integrated signal to a central transmitting or recording station for either immediate or subsequent broadcast. The transmitted signal from this system will be the systems instantaneous presentation of two superposed images of relatively opposite colors such as green or red for example. In the receiving end the observer viewing on a color television set need only wear glasses with each lens having an appropriate color filter such as green and red in order to gain the illusion of three dimensional images. This is due to the fact that the one filter would prevent one of the images from reaching one of the eyes of the observer and the other filter would prevent the other of the images from reaching the other eye of the observer.

It can be seen that black and white images could be photographed in a similar manner by black and white cameras and subsequently the two black and white pictures could be photographed electronically by two colored television cameras through appropriate filters to obtain the same effect. This latter technique would have the advantage of eliminating some of the spurious color interference which might develop from a direct color source material.

As it can be seen in the method of this invention the picture appearing on the color receiver is a composite of two images formed of opposite colors. The observer thereafter need only wear eyeglasses providing each eye with appropriate oppositely colored filters so that the two superposed images are each only visible to one of the eyes of the observer.

Figure 2:
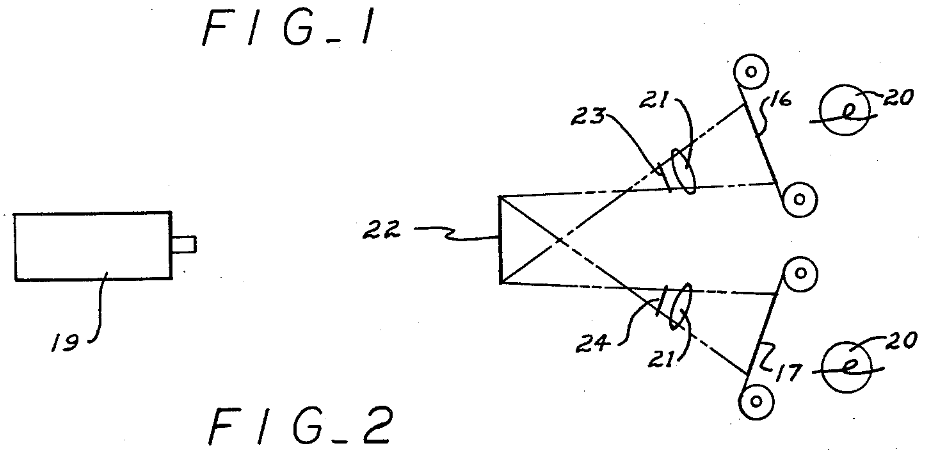
Figure 3:
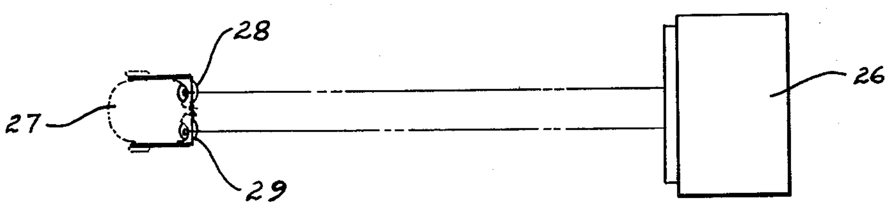

In the drawings FIG. 1 shows a diagrammatic view of an embodiment of the invention for initially photographing an image from two positions. FIG. 2 is a diagrammatic view illustrating the presentation of both images through separately colored filters for photographing by a color video camera, and FIG. 3 shows a diagrammatic view of an observer observing a three-dimensional picture. An image 15 is photographed from two side by side positions on two films 16 and 17 through appropriate lenses 18. The images of the two films 16 and 17 after processing are then projected so that the combined overlapping images can be photographed by a color television camera 19. This is accomplished by employing light sources 20 which shine through films 16 and 17 and appropriate lens systems 21 onto a screen 22. A filter 23 is interposed between film 16 and screen 22 so that the projected image on the screen 22 will be of a selected color. A similar filter 24 is placed in the optical path for projection of film 17. Filter 24 is of an oppositely keyed color to filter 23. The image is then reproduced on a color television receiver 26 where an observer 27 can then watch the image through glasses having a lens 28 which is keyed to the color of filter 24. The viewer will then see only the image of film 16 with his left eye and only the image of film 17 with his right eye. The effect produced will be a stereoscopic illusion.

For the purpose of claim terminology the term "photographing" is intended to include the electronic photographing such as accomplished through "Kinescopes" and other forms of television cameras as well as the chemical type of photographing as is accomplished through silver nitrate and other chemical processes.

The term "stereoscopic" is intended to include the technique of photographing in which two pictures of a subject have been simultaneously taken in side by side relation so that when they are later separately simultaneously viewed by each eye of an observer a three dimensional or stereoscopic illusion will be created.

In addition for the purpose of claim terminology the term "televised" indicates the specific art of converting an image into electrical impulses which can be transmitted and reconverted to a video image by a television receiver.

Although the foregoing invention has been described in some detail by way of example for purposes of clarity of understanding, it is understood that certain changes and modifications may be practiced within the spirit of the invention as limited only by the scope of the appended claim.

What is claimed:

A method of producing a television broadcast giving the illusion of a three dimensional image consisting of the steps of: photographing a subject on black and white film simultaneously from two positions in stereoscopic relationship to each other; viewing the two photographed images with a color television camera through filters of opposite colors; positioning the filters so that the first of said images is viewed in one color and the second of said images is viewed in an opposite color; sequentially reproducing said images on a television screen in superposed relationship; and viewing the television screen through two filters each oppositely colored to prevent optical viewing of opposite ones of the reproduced colored pictures.

References Cited in the file of this patent

UNITED STATES PATENTS

| | | |
|---|---|---|
| 2,384,260 | Goldsmith | Sept. 4, 1945 |
| 2,508,920 | Kell | May 23, 1950 |
| 2,566,700 | Goldsmith | Sept. 4, 1951 |
| 2,612,553 | Homrighous | Sept. 30, 1952 |
| 2,865,988 | Cafarelli | Dec. 23, 1958 |

OTHER REFERENCES

"3-Dimensional TV System," L. I. Mengle, RCA publication, reprinted from Radio and TV News, October 1958.

"Compatible 3-D TV," TELE-TECH and Electronic Industries, January 1954, pages 152, 153.